(12) United States Patent
Desclos et al.

(10) Patent No.: US 10,177,433 B2
(45) Date of Patent: Jan. 8, 2019

(54) LOW-PROFILE MOUNTING APPARATUS FOR ANTENNA SYSTEMS

(71) Applicant: Ethertronics, Inc., San Diego, CA (US)

(72) Inventors: Laurent Desclos, San Diego, CA (US); Francisco Carlos Sanchez Ortiz, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 0 days.

(21) Appl. No.: 15/924,780

(22) Filed: Mar. 19, 2018

(65) Prior Publication Data

US 2018/0212302 A1 Jul. 26, 2018

Related U.S. Application Data

(63) Continuation of application No. 15/150,255, filed on May 9, 2016, now Pat. No. 9,923,260.

(60) Provisional application No. 62/159,078, filed on May 8, 2015.

(51) Int. Cl.
*H01Q 1/12* (2006.01)
*H01Q 1/00* (2006.01)
*F16B 9/02* (2006.01)

(52) U.S. Cl.
CPC ........... *H01Q 1/1214* (2013.01); *H01Q 1/005* (2013.01); *F16B 9/023* (2013.01)

(58) Field of Classification Search
CPC .... H01Q 1/1214; H01Q 1/005; H01Q 1/1207; F16B 2/065; F16B 2/10
USPC .......... 248/511, 519, 523, 527, 541; 47/40.5
See application file for complete search history.

(56) References Cited

U.S. PATENT DOCUMENTS

| | | | | |
|---|---|---|---|---|
| 2,786,884 A * | 3/1957 | Chadowski | .......... | H01Q 1/1214 174/153 A |
| 2,913,202 A * | 11/1959 | Meldrum | ................ | A47G 33/12 248/523 |
| 3,739,387 A * | 6/1973 | Budrow | ................... | H01Q 1/08 343/714 |
| 5,014,461 A * | 5/1991 | von Braucke | ......... | A47G 33/12 248/523 |
| 5,743,505 A * | 4/1998 | Sofy | ....................... | A47G 33/12 248/346.01 |
| 5,845,890 A * | 12/1998 | Earsley | .............. | A47G 33/1226 248/516 |
| 6,236,377 B1 * | 5/2001 | Hussaini | .............. | H01Q 1/1207 343/715 |
| 6,877,708 B1 * | 4/2005 | Thurner | ............. | A47G 33/1213 248/519 |
| 2008/0296465 A1 * | 12/2008 | Schommertz | ...... | A47G 33/1213 248/523 |
| 2010/0175317 A1 * | 7/2010 | Crilly | ................... | A47G 33/045 47/42 |
| 2011/0284717 A1 * | 11/2011 | Schulz | ............... | A47G 33/1213 248/515 |

* cited by examiner

*Primary Examiner* — Muhammad Ijaz
(74) *Attorney, Agent, or Firm* — Dority & Manning, P.A.

(57) ABSTRACT

The disclosure concerns a low-profile mounting apparatus for use with installation and aesthetic positioning of distributed antenna systems (DAS) and other similar antenna modules. The mounting apparatus is used to minimize the exposed profile of an installed antenna module.

17 Claims, 7 Drawing Sheets

LOW-PROFILE MOUNTING APPARATUS FOR ANTENNA SYSTEMS

CROSS-REFERENCE TO RELATED APPLICATIONS

This present application is a continuation of U.S. application Ser. No. 15/150,255, filed May 9, 2016, which claims benefit of priority with U.S. Provisional Ser. No. 62/159,078, filed May 8, 2015; the contents of which are hereby incorporated by reference.

BACKGROUND

Field of the Invention

This invention relates to distributed antenna systems (DAS); and more particularly, to a low-profile mounting apparatus for recessed mounting of DAS antennas.

Description of the Related Art

Distributed Antenna Systems (DAS), pico cell, femto cell, WLAN and other antennas are becoming increasingly used in buildings for distributing communications among users. The required installation time and ease of installation are two primary considerations for selection of such systems. A typical DAS antenna installed in an office building will be attached to a ceiling tile of the type commonly found in modern buildings. The DAS antenna is currently attached to the surface of the tile that faces downward towards the floor, with a hole cut through the tile to accommodate the coaxial connection required for operation of the antenna. Screws can be used to attach the antenna to the ceiling for support. Alternatively, and to ease installation, a single threaded plastic collar and nut, for example as described in commonly owned U.S. pub. US2015/0207202, can be used to attach the antenna using a single connection.

Many of these antennas are relatively large and are often aesthetically invasive into the office space for which they serve. There is a need to reduce the profile of the antenna without compensating antenna performance.

SUMMARY

In view of the needs and limitations set forth above, a low-profile mounting apparatus for use with installation of DAS antenna modules and other similar antennas is described herein. The low-profile mounting apparatus includes a support ring assembly configured for nested engagement with a ceiling tile, wherein the support ring assembly is configured to receive and cradle a nested DAS antenna module, or other antenna module, such that only a portion of the antenna module penetrates through the tile and is exposed to the interior of the office for which the unit is installed. In this regard, a portion of the DAS antenna module is exposed to the interior of the office for minimal aesthetic intrusion, and a remaining portion extends above the ceiling tile out-of-sight.

BRIEF DESCRIPTION OF THE DRAWINGS

These and other features are further illustrated and described in the appended detailed descriptions and drawings, wherein.

DETAILED DESCRIPTION

Figure 1:
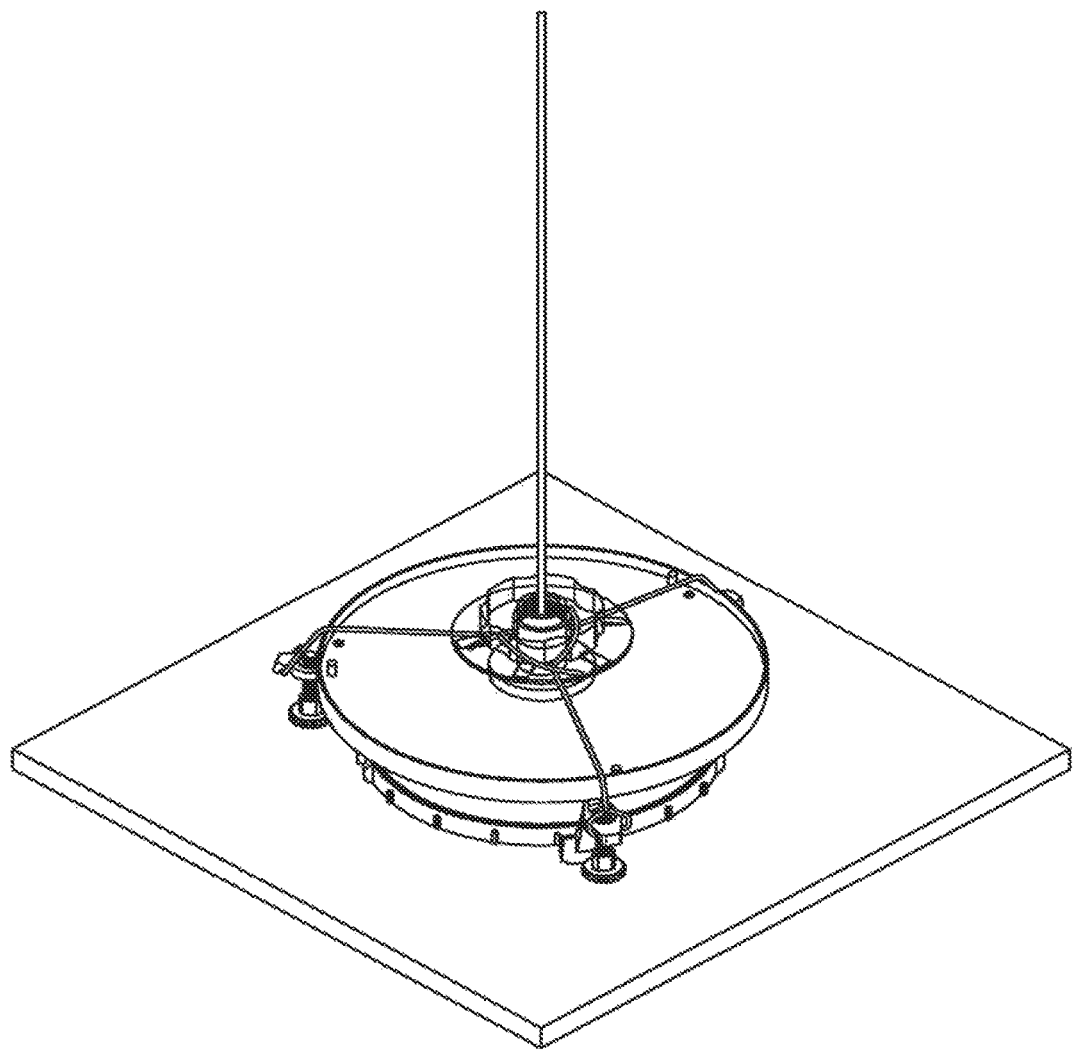
FIG. 1 shows a DAS antenna module installed in a ceiling tile using a low-profile mounting apparatus in accordance with an embodiment.

In the following description, for purposes of explanation and not limitation, details and descriptions are set forth in order to provide a thorough understanding of the embodiments of the invention. However, it will be apparent to those skilled in the art that the present invention may be practiced in other embodiments, including certain variations or alternative combinations that depart from these details and descriptions. The illustrated embodiment is not intended to be limiting of the spirit and scope of the invention as set forth in the claims. Certain features of one embodiment may be further combined with features of another embodiment to achieve similar results.

In a general embodiment, a low-profile mounting apparatus for installation of a distributed antenna system (DAS) antenna module is described. Although the DAS antenna is being used in the illustrated embodiments, this concept of recessed mounting for antennas can be applied to several other antennas, such as: pico cell, femto cell, and WLAN antennas, among others. For purposes of illustration, we will discuss the disclosed mount as it relates to DAS antenna modules; however, similar mounts can be produced for other antennas in order to achieve predictable results for recessed antenna mounting.

A conventional ceiling tile is cut or formed to provide an aperture for communicating a portion of a DAS antenna module therethrough. The low-profile mounting apparatus includes an annular support ring configured to engage the ceiling tile at the aperture, and further configured to receive and cradle a portion of the DAS antenna module such that only a portion of the DAS antenna module extends through the aperture for providing a low-profile exposure with the room beneath the ceiling tile.

In an embodiment, the DAS antenna module is installed in a manner such that only a portion of the DAS antenna module extends through an aperture of a ceiling tile for providing a low-profile exposure beneath the ceiling.

In another embodiment, the DAS antenna module is installed in a manner recessed above the ceiling tile such that the DAS antenna module does not extend through the aperture of a ceiling tile. The support ring is configured to receive and mount the DAS antenna module above the ceiling tile, or in such a way that the DAS antenna module is flush with a surface of the ceiling tile.

In another embodiment, the mounting apparatus is capable of holding a variety of different DAS antenna modules, each with a distinct size. The ring can be adapted to conform to the profile of a variety of DAS antenna modules.

The instant mounting apparatus provides a low-cost recessed DAS antenna module installation that is quick and simple to install making it an attractive solution for most buildings.

Now, turning to the drawings, FIGS. 1-6 illustrate various views of a low-profile mounting apparatus for installation of a distributed antenna system (DAS) antenna module in accordance with a first illustrated embodiment.

FIG. 1 shows a DAS antenna module installed in a ceiling tile using a low-profile mounting apparatus in accordance with an embodiment.

Figure 2:
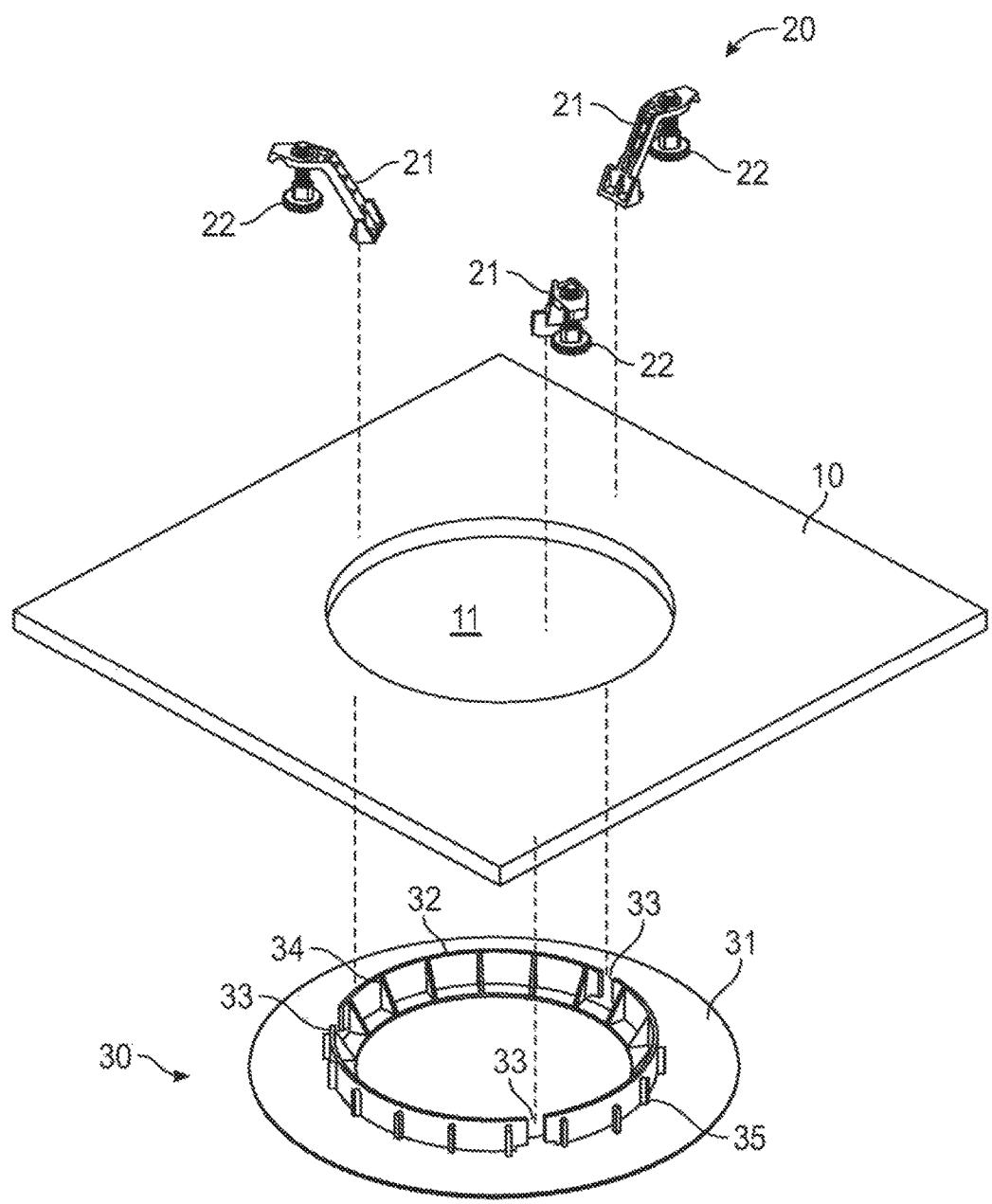
FIG. 2 shows an exploded view of the ceiling tile and components of a support ring assembly for mounting the DAS antenna illustrated in FIG. 1.

FIG. 2 shows an exploded view of the ceiling tile and components of a support ring assembly for mounting the DAS antenna illustrated in FIG. 1.

The ceiling tile 10 includes an aperture 11 for receiving the mounting apparatus. The aperture can be cut into a conventional ceiling tile. Alternatively, a ceiling tile with an aperture as depicted may be fabricated using other known manufacturing methods.

A support ring 30 is inserted into the aperture 11 of the ceiling tile 10. The support ring 30 includes a structure having a planar base 31 configured to extend within a longitudinal plane, and a cylindrical wall 32 extending vertically from the base. The base is adapted to abut an underside surface of the ceiling tile which is configured to face the room beneath the ceiling tile, whereas the cylindrical wall is adapted to engage the interior surface of the aperture providing a frictional or other fitment therebetween. One or more gripping tabs 35 can be provided and configured to extend radially outwardly from the cylindrical wall for improved fitment with the interior surface of the aperture. In this regard, the gripping tabs may penetrate into a volume of the ceiling tile, or enhance frictional grip therebetween. The gripping tabs 35 can be further used to resist rotation of the support ring 30 about the ceiling tile 10. The cylindrical wall can be supported about the base using the gripping tabs 35 and one or more angled supports 34. The angled supports 34 can serve the function of providing support between the base 31 and the cylindrical wall 32, and can further serve the function of providing an angled nesting support for cradling a DAS antenna module. The planar base can form an annular shape. In this regard, the angled supports 34 can extend from an inner periphery of the planar base 31 to an upper terminus of the cylindrical wall 32. The angle associated with the angled supports 34 is ideally similar to a surface of the DAS antenna module to be installed for providing a nested fitment between the DAS antenna module and the support ring assembly. The support ring 30 further includes one or more slots 33 disposed about the cylindrical wall, wherein each of the slots is configured to receive and engage a support arm assembly 20.

The support arm assemblies 20 as-illustrated include a support art 21 configured to engage the respective slot 33 of the support ring 30 and extend radially outwardly therefrom to a distal end. A thumb screw 22 or other adjustable component extends from the support arm 21 at the distal end and is used to secure the support arm 21 against the ceiling tile 10 such that the ceiling tile is disposed between each of the screws and the base of the support ring. Although the illustrated embodiment depicts three support arm assemblies for attachment with the tile, up to any number of support arm assemblies can similarly be incorporated to yield similar results.

Moreover, although the support ring base 31 is depicted as an annular disc having an outer periphery and an inner periphery in the illustrated embodiment, the invention can be practiced by providing a square base or other geometry. However, it is preferred that the annular support ring be configured to receive and cradle a portion of a DAS antenna module, or other antenna module, in a nested engagement. Thus, the support ring should be configured to contour a surface of the DAS antenna module.

To assemble the support ring assembly (support ring and support arm assemblies) about the ceiling tile, the support ring 30 is first inserted into the aperture 11 of the ceiling tile 10, and the support arm assemblies 20 are inserted in the slots 33 of the support ring 30 prior to tightening the thumb screws 22.

Figure 3:
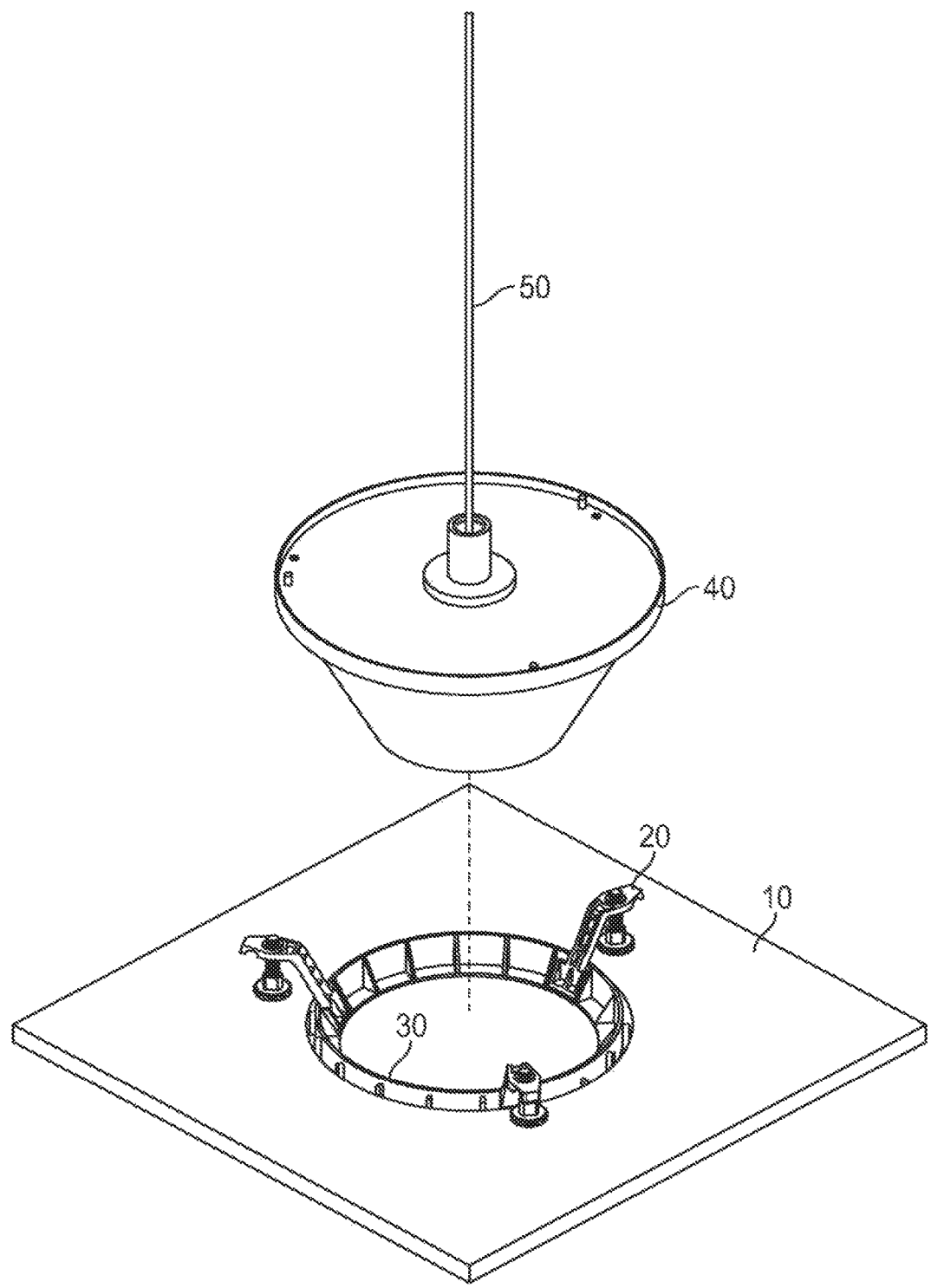
FIG. 3 shows an exploded view of the DAS antenna module configured to nest with the support ring assembly and tile combination of FIG. 2.

FIG. 3 shows an exploded view of the DAS antenna module configured to nest with the support ring assembly and tile combination of FIG. 2. The distributed antenna system (DAS) antenna module 40 includes an outer housing having a surface contour thereof. At least a portion of the outer housing surface is nested against the support ring, and in particular about the angled supports thereof. In this regard, a portion of the DAS antenna module is communicated through the support ring for exposing into the interior of the room beneath the ceiling tile, effectively reducing the exposed profile of the DAS antenna module into the room. The DAS antenna module 40 is connected to a coaxial or other transmission cable 50 that is routed above the ceiling tile and connected to the DAS network. Note that the amount of exposed DAS housing will depend on the inner contour dimensions of the support ring as the DAS module is generally tapered with a smaller diameter at the bottom side of the housing and an increasingly larger diameter going upward toward a top side of the DAS module. Accordingly, the exposed profile of the DAS module can be configured by expanding or reducing the inner contour dimensions of the support ring.

Figure 4:
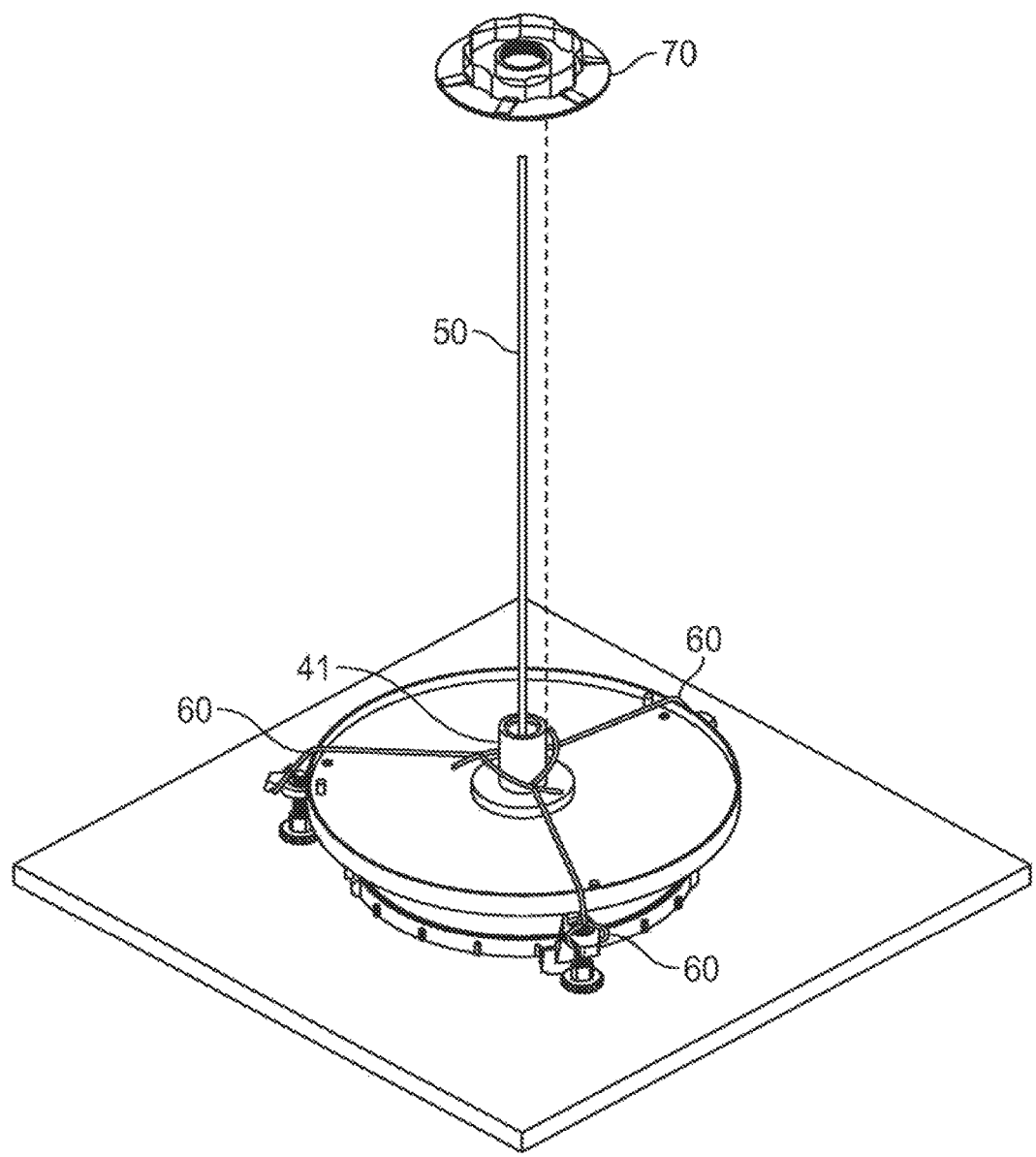
FIG. 4 shows attachment members for attaching the DAS antenna module with the nested support ring assembly, and a mounting flange used for installation of the DAS antenna module.

FIG. 4 shows attachment members for attaching the DAS antenna module with the nested support ring assembly, and a mounting flange used for installation of the DAS antenna module. Once the DAS antenna module is nested with the installed support ring assembly, up to several attachment members 60 can be applied. In the illustrated example, the attachment members 60 comprise pliable bands having a first loop end configured to lasso the distal end of a respective support arm and a second loop end configured to lasso the threaded shaft 41 of the DAS antenna module. A distinct attachment is used for each support arm. Although the attachment members are illustrated as flexible or pliable bands, such as rubber or elastic polymer bands, it should be noted that a rigid attachment member can be similarly implemented to secure the top portion of the DAS antenna module about the annular support ring assembly. However, the elastic band attachment members provide the added support against earthquakes and other structural influences.

A mounting flange 70 as described in commonly owned U.S. Ser. No. 14/564,017, titled "MOUNTING FLANGE FOR INSTALLATION OF DISTRIBUTED ANTENNA SYSTEMS" is provided for securing the DAS antenna to structural supports of a building; the contents of which are hereby incorporated by reference.

Figure 5:
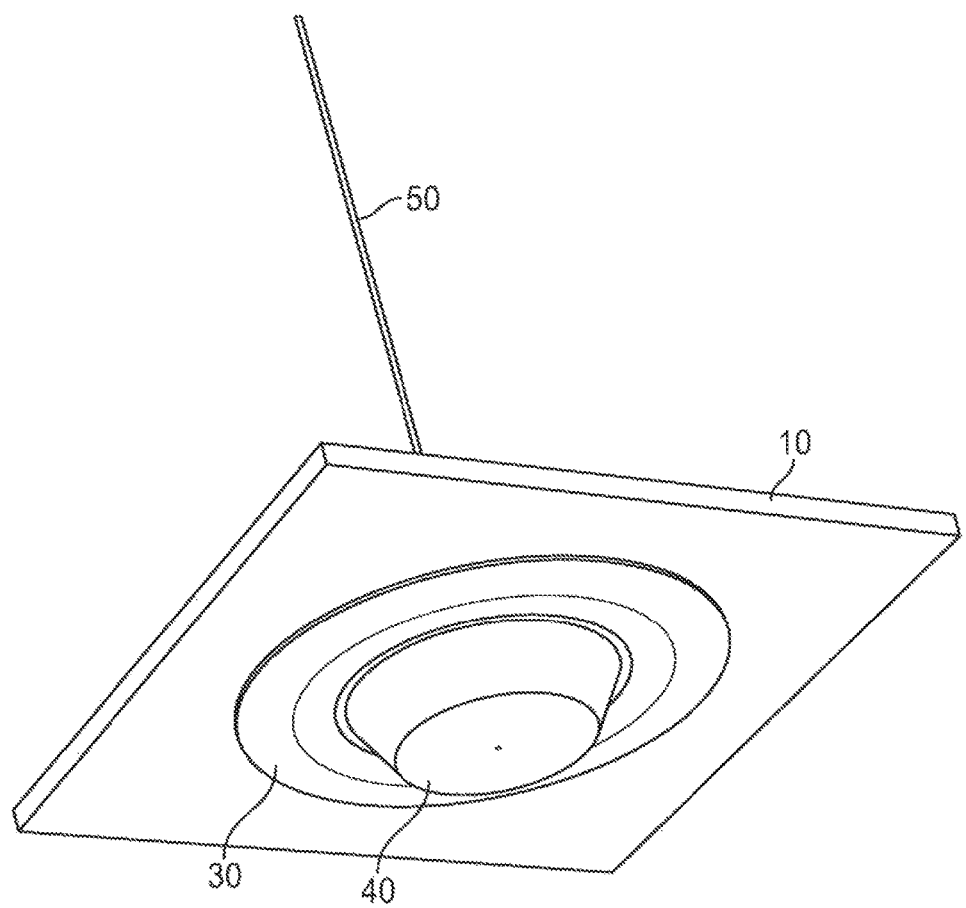
FIG. 5 shows a perspective view of the installed DAS antenna module and low-profile mounting assembly.

FIG. 5 shows a perspective view of the installed DAS antenna module and low-profile mounting assembly. Visible from the underside of the ceiling tile 10 is only a portion of the DAS antenna module 40 and a portion of the support ring 30. The coaxial cable 50 extends above the ceiling tile and is not visible from within the room beneath the ceiling tile.

Figure 6:
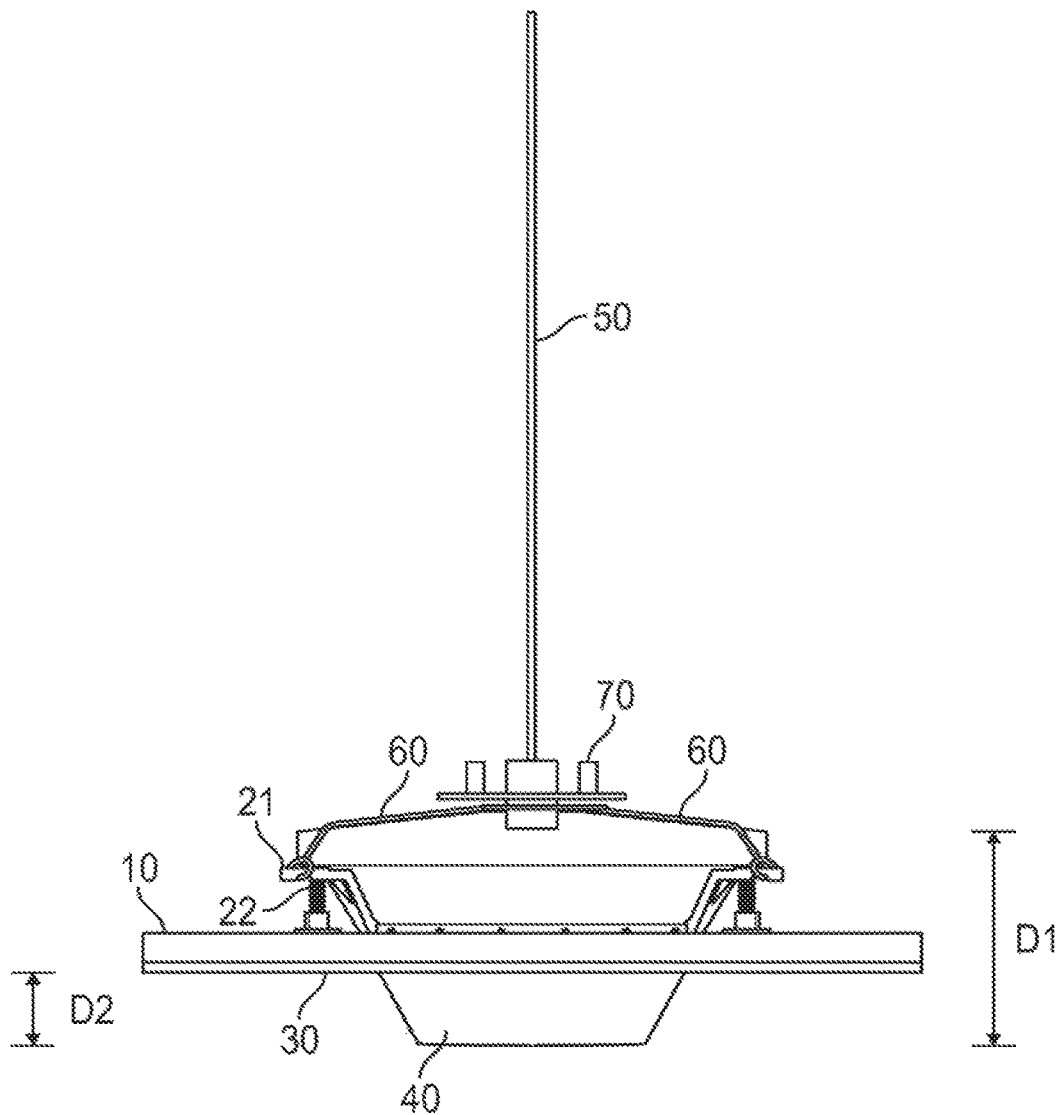
FIG. 6 shows a side view of the installed DAS antenna module and low-profile mounting assembly.

FIG. 6 shows a side view of the installed DAS antenna module and low-profile mounting assembly. A portion of the DAS antenna module 40 extends through the annular support ring 30 for exposure to the room beneath the ceiling tile 10. The exposed profile D2 of the DAS antenna module is less than the entire profile thereof D1. The support arms 21 are adjusted against the ceiling tile using thumb screws 22. The annular support ring assembly is configured to nest with a surface of the DAS antenna module 40 above the ceiling tile. Attachment members 60 expand from the distal end of the support arms 21 to the threaded shaft of the DAS antenna module for securing the DAS antenna module about the annular support ring assembly. The mounting flange 70 is attached to the DAS antenna module at the threaded shaft, and can be used to further lock the attachment members 60 in place against the top side of the DAS antenna module 40. The coaxial cable 50 extends through the mounting flange and above the ceiling tile to connect with the DAS network.

Figure 7:
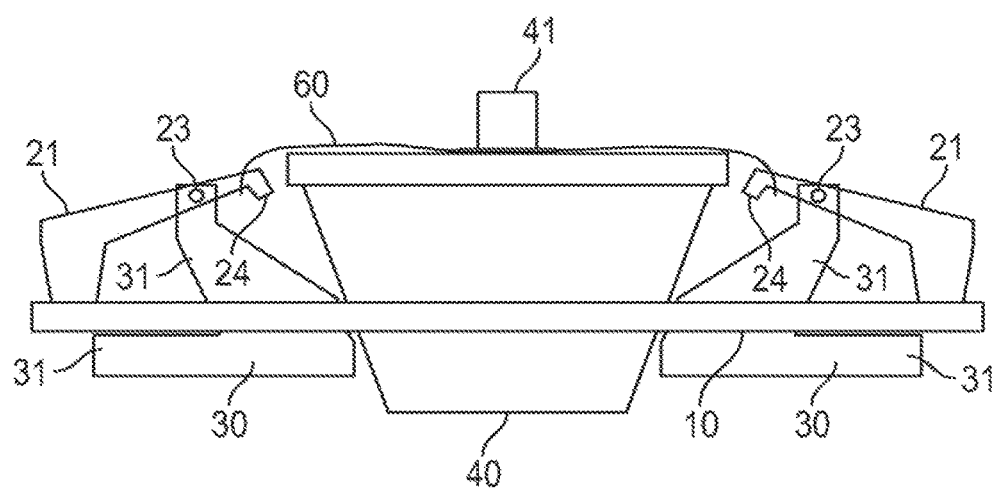
FIG. 7 shows a side view of an installed DAS antenna module and low-profile mounting assembly in accordance with another embodiment.

FIG. 7 shows a side view of an installed DAS antenna module 40 and low-profile mounting assembly in accordance with another embodiment. The mounting assembly includes a ring structure 30 similar to that in the above embodiment; however the engagement of the support arms 21 are shown as hingedly coupled to the ring structure at a fulcrum 23. The support arm 21 includes a distal end configured to press against an upper surface of the ceiling tile 10 as a proximal end 24 is leveraged using an attachment member 60. The attachment member is easily attached to the threaded shaft 41 of the DAS antenna module 40, and further extended to lasso the proximal end 24 of the support arm 21. In this regard, the ring and support arm form a clamp about the ceiling tile that is secured with resistance of the attachment member applied to the proximal end 24 of support arm 21. Although only one support arm is illustrated, two or more support arms may be implemented around the ring support structure 13.

The illustrated embodiment is provided for the purpose of enabling the invention; however, it will be apparent to those having skill in the art that other similar embodiments may be practices for the purpose of installing a DAS antenna module about a ceiling tile in a manner which yields a low-profile exposure beneath the tile. Therefore, the disclosure is not intended to limit the spirit and scope of the invention as set forth in the claims.

REFERENCE CHARACTERS LIST

Ceiling tile (10)
Aperture (11)
Support arm assembly (20)
Support arm (21)
Thumb screw (22)
Annular support ring (30)
Planar disc base (31)
Cylindrical wall (32)
Slot (33)
Angled support (34)
Gripping tabs (35)
DAS antenna module (40)
Coaxial cable (50)
Attachment member (60)
Mounting flange (70)
DAS module exposed profile (D1)
DAS module entire profile (D2)

What is claimed is:

1. An antenna mounting apparatus for mounting an antenna module in a ceiling tile, the antenna mounting apparatus comprising:
    an annular support ring structure having a horizontal base and at least one vertical portion, the vertical portion being configured to extend from the base and engage with an aperture of a ceiling tile;
    the annular support ring structure configured to receive at least a portion of the antenna module such that only the portion of the antenna module is exposed beneath the ceiling tile when the antenna module is installed in the mounting apparatus;
    further comprising one or more attachment members, each of the one or more attachment members configured to couple with a distal end of a respective support arm and further configured to couple with the antenna module for securing the antenna module in a nested configuration within the annular support ring.

2. The antenna mounting apparatus of claim 1, wherein the vertical portion comprises a cylindrical wall extending from the horizontal base.

3. The antenna mounting apparatus of claim 2, wherein the cylindrical wall comprises one or more slots disposed about a surface thereof.

4. The antenna mounting apparatus of claim 1, wherein the annular support ring comprises one or more gripping tabs extending radially outwardly from the vertical portion.

5. The antenna mounting apparatus of claim 1, wherein the annular support ring comprises one or more angled supports extending from the horizontal base to a terminal end of the vertical portion.

6. The antenna mounting apparatus of claim 3, wherein the annular support ring structure comprises one or more support arm assemblies, each of the one or more support arm assemblies comprising a support arm configured to engage with one of the one more slots disposed on the vertical portion.

7. The antenna mounting apparatus of claim 6, wherein the one or more support arm assemblies each comprise an adjustable component configured to secure the support ring to the ceiling tile.

8. The antenna mounting apparatus of claim 7, wherein the adjustable component comprises a thumb screw.

9. The antenna mounting apparatus of claim 1, wherein the one or more attachment members comprise one or more flexible bands.

10. The antenna mounting apparatus of claim 9, wherein each of the one or more flexible bands comprise a loop disposed at an end of the flexible band.

11. The antenna mounting apparatus of claim 1, wherein the one or more attachment members comprise one or more rigid structures.

12. The antenna mounting apparatus of claim 1, wherein the antenna module is part of a distributed antenna system.

13. An antenna mounting apparatus for mounting an antenna module in a ceiling tile, comprising:
    a support ring, the support ring comprising an annular base having an outer periphery and an inner periphery, the inner periphery formed from an aperture of the base, the support ring comprising a cylindrical wall extending vertically from the base, the cylindrical wall having one or more slots; and
    one or more support arm assemblies, each of the support arm assemblies comprising a support arm configured to attach with the cylindrical wall at one of the one or more slots, each of the support arm assemblies comprising an adjustable component to adjustable secure the support ring to the ceiling tile.

14. The antenna mounting apparatus of claim 13, wherein the adjustable component comprises a thumb screw.

15. The antenna mounting apparatus of claim 13, wherein the support ring further comprises a plurality of gripping tabs extending outwardly from the cylindrical wall.

16. The antenna mounting apparatus of claim 13, wherein the support ring comprises a plurality of angled supports extending from the inner periphery of the base to a terminal end of the cylindrical wall.

17. The antenna mounting apparatus of claim 13, wherein the antenna module is part of a distributed antenna system.

\* \* \* \* \*